United States Patent
Hencinski et al.

(10) Patent No.: US 12,197,570 B2
(45) Date of Patent: Jan. 14, 2025

(54) SYSTEMS AND METHODS FOR CYBER SECURITY THREAT DETECTION AND EXPEDITED GENERATION OF INVESTIGATION STORYBOARDS USING INTELLIGENT CYBER SECURITY AUTOMATIONS

(71) Applicant: Expel, Inc., Herndon, VA (US)

(72) Inventors: Jonathan Hencinski, Herndon, VA (US); Emily Garton, Frederick, MD (US); Jasper Tom, Arlington, VA (US); Pat Conley, Rochester, NY (US); David Spigarelli, Reston, VA (US); Roger Studner, Herndon, VA (US)

(73) Assignee: Expel, Inc., Herndon, VA (US)

( * ) Notice: Subject to any disclaimer, the term of this patent is extended or adjusted under 35 U.S.C. 154(b) by 0 days.

(21) Appl. No.: 18/390,919

(22) Filed: Dec. 20, 2023

(65) Prior Publication Data

US 2024/0126875 A1 Apr. 18, 2024

Related U.S. Application Data

(63) Continuation of application No. 18/108,293, filed on Feb. 10, 2023, now Pat. No. 11,886,580, which is a (Continued)

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS 9,565,204 B2 * 2/2017 Chesla ............... H04L 63/145
10,686,830 B2 * 6/2020 Jang ............... H04L 63/1441
(Continued)

*Primary Examiner* — Joseph P Hirl
*Assistant Examiner* — Hassan Saadoun
(74) *Attorney, Agent, or Firm* — Padowithz Alce; Chandler Scheitlin; Alce PLLC

(57) ABSTRACT

A system and method for generating a digital cybersecurity artifact includes selectively executing an automated cybersecurity investigation workflow based on a probable cybersecurity threat type of a cybersecurity event, wherein an output of the automated cybersecurity investigation workflow includes one or more corpora of investigation findings data in response to executing the automated cybersecurity investigation workflow; selectively instantiating a digital cybersecurity artifact of a plurality of digital cybersecurity artifacts based on the probable cybersecurity threat type of the cybersecurity event, wherein the digital cybersecurity artifact includes a plurality of distinct regions electronically mapped to one or more threat type-specific content automations that, when executed, install investigation findings data into the plurality of distinct regions of the plurality of distinct regions of the digital cybersecurity artifact with selective subsets of investigation findings data of the one or more corpora of investigation findings data.

20 Claims, 5 Drawing Sheets

Related U.S. Application Data continuation of application No. 17/859,800, filed on Jul. 7, 2022, now Pat. No. 11,604,875, which is a continuation of application No. 17/591,185, filed on Feb. 2, 2022, now Pat. No. 11,416,609.

(60) Provisional application No. 63/153,693, filed on Feb. 25, 2021.

(56) References Cited

U.S. PATENT DOCUMENTS

| | | | |
|---|---|---|---|
| 10,958,672 B2* | 3/2021 | Bird | G06F 21/56 |
| 11,082,434 B2* | 8/2021 | Ravindra | G06F 40/30 |
| 11,271,955 B2* | 3/2022 | Vashisht | G06F 16/285 |
| 2017/0054752 A1* | 2/2017 | Nguyen | H04L 63/1491 |
| 2017/0134400 A1* | 5/2017 | Nguyen | H04L 63/1416 |
| 2020/0089885 A1* | 3/2020 | Kling | G06F 21/566 |
| 2020/0380130 A1* | 12/2020 | Purushotham | G06F 21/566 |
| 2021/0021628 A1* | 1/2021 | Sbandi | H04L 63/20 |
| 2021/0126938 A1* | 4/2021 | Trost | G06F 21/552 |
| 2021/0234884 A1* | 7/2021 | Brown | H04L 63/1433 |

\* cited by examiner

200

Identifying Security Data Signals S210

Generating and Triaging System Validated Security Alerts S220

Identifying and Executing an Automated Investigation Workflow S230

Providing Incident-to-Intelligent Notifications S235

Sourcing an Intelligent Investigation Storyboard S240

Generating an Incident-Specific Investigation Storyboard S250

SYSTEMS AND METHODS FOR CYBER SECURITY THREAT DETECTION AND EXPEDITED GENERATION OF INVESTIGATION STORYBOARDS USING INTELLIGENT CYBER SECURITY AUTOMATIONS

CROSS-REFERENCE TO RELATED APPLICATIONS

This application is a continuation of U.S. patent application Ser. No. 18/108,293, filed 10 Feb. 2023, which is a continuation of U.S. Pat. No. 11,604,875, filed 7 Jul. 2022, which is a continuation of U.S. Pat. No. 11,416,609, filed 2 Feb. 2022, which claims the benefit of U.S. Provisional Application No. 63/153,693, filed 25 Feb. 2021, which are incorporated in their entireties by this reference.

TECHNICAL FIELD

This invention relates generally to the cybersecurity field, and more specifically to a new and useful cyber threat detection and mitigation system and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slowdown the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets. Furthermore, there is an additional need in the art to intelligently communicate and create explainable content to key stakeholders and affected users of a subscribing organizational entity based on detected security threats and/or detected cybersecurity events.

The embodiments of the present application described herein provide technical solutions that address, at least the needs described above.

BRIEF SUMMARY OF THE INVENTION(S)

In one embodiment, a method for automatically generating a digital cybersecurity artifact for accelerating a mitigation of a cybersecurity event includes at a cybersecurity event detection and response service: identifying a cybersecurity event based on event data or activity data associated with a subscriber to the cybersecurity event detection and response service; selectively executing an automated cybersecurity investigation workflow of a plurality of automated cybersecurity investigation workflows based on a probable cybersecurity threat type of the cybersecurity event, wherein an output of the automated cybersecurity investigation workflow includes one or more corpora of investigation findings data in response to executing the automated cybersecurity investigation workflow; selectively instantiating a digital cybersecurity artifact of a plurality of digital cybersecurity artifacts based on the probable cybersecurity threat type of the cybersecurity event, wherein the digital cybersecurity artifact includes a plurality of distinct regions comprising one or more threat type-specific content automations that, when executed, install investigation findings data into the one or more threat type-specific content automations with selective subsets of investigation findings data of the one or more corpora of investigation findings data; and generating a cybersecurity event-specific reporting artifact, wherein the generating of the cybersecurity event-specific reporting artifact includes installing investigation findings data into the one or more threat type-specific content automations of the digital cybersecurity artifact with the selective subsets of the investigation findings data of the one or more corpora of investigation findings data.

In one embodiment, the selective instantiation of the digital cybersecurity artifact of the plurality of digital cybersecurity artifacts includes identifying a reference mapping between each of a plurality of cybersecurity threat types and one or more distinct cybersecurity digital artifacts; and identifying the digital cybersecurity artifact for the cybersecurity event based on evaluating the probable cybersecurity threat type of the cybersecurity event against the reference mapping.

In one embodiment, the selective instantiation of the digital cybersecurity artifact of the plurality of digital cybersecurity artifacts includes identifying a reference mapping between each of a plurality of cybersecurity threat types and one or more distinct cybersecurity digital artifacts; and identifying the digital cybersecurity artifact for the cybersecurity event based on performing a search of the reference mapping using the probable cybersecurity threat type of the cybersecurity event.

In one embodiment, the method includes wherein one of the one or more threat type-specific content automations of the digital cybersecurity artifact includes a login-to-location graphical automation that, when executed graphically displays login activity data of a target user account associated with the cybersecurity event superimposed on a geographical map.

In one embodiment, the method includes wherein one of the one or more threat type-specific content automations of the digital cybersecurity artifact includes a login-to-time graphical automation that, when executed graphically indicates login activity data of a target user account associated with the cybersecurity event with respect to time.

In one embodiment, the method includes wherein one of the one or more threat type-specific content automations of the digital cybersecurity artifact includes an event digest automation comprising a prefabricated string of text that includes a plurality of slot-filling values within the prefabricated string of text, and wherein the event digest automation, when executed, generates an event digest by interweaving investigation findings data within the prefabricated string of text at the locations of the slot-filling values.

In one embodiment, the method includes wherein one region of the plurality regions of the digital cybersecurity artifact includes a login-to-location graphical automation, a login-to-time graphical automation, and an event digest content automation.

In one embodiment, the method includes wherein one of the one or more threat type-specific content automations of the digital cybersecurity artifact, when executed identifies cybersecurity intelligence data derived based on the one or more corpora of investigation findings data, and installs the cybersecurity intelligence data into at least one distinct region of the plurality of distinct regions of the digital cybersecurity artifact.

In one embodiment, the method includes wherein the cybersecurity intelligence data includes a service-generated graphical illustration of metrics associated with activities of the cybersecurity event.

In one embodiment, the method further includes augmenting the cybersecurity event-specific reporting artifact to include one or more additional threat type-specific automations distinct from the one or more threat type-specific content automations of the digital cybersecurity artifact.

In one embodiment, the method further includes displaying, via a web-based user interface of the cybersecurity event detection and response service, the cybersecurity event-specific reporting artifact, and wherein the web-based user interface of the cybersecurity event detection and response service is electronically accessible by the subscriber.

In one embodiment, the method further includes in response to generating the cybersecurity event-specific reporting artifact, mitigating, via one or more mitigation actions, a cybersecurity threat based on the one or more threat type-specific automations of the cybersecurity event-specific reporting artifact.

In one embodiment, a method for automatically generating a digital cybersecurity artifact for accelerating a mitigation of a cybersecurity event includes selectively executing an automated cybersecurity investigation workflow of a plurality of automated cybersecurity investigation workflows based on a cybersecurity event of a subscriber, wherein an output of the automated cybersecurity investigation workflow includes a generation of one or more corpora of investigation findings data in response to executing the automated cybersecurity investigation workflow; selectively instantiating a digital cybersecurity artifact of a plurality of digital cybersecurity artifacts based on a cybersecurity threat type of the cybersecurity event, wherein the digital cybersecurity artifact includes a plurality of distinct regions comprising one or more threat type-specific content automations that, when executed, install investigation findings data into the one or more threat type-specific content automations with selective subsets of investigation findings data of the one or more corpora of investigation findings data; and generating a cybersecurity event-specific reporting artifact, wherein the generating of the cybersecurity event-specific reporting artifact includes installing investigation findings data into the one or more threat type-specific content automations of the digital cybersecurity artifact with the selective subsets of the investigation findings data of the one or more corpora of investigation findings data.

In one embodiment, the method includes wherein at least one of the one or more threat type-specific content automations includes one or more selectable regions that, when selected by the subscriber exposes the selective subsets of investigation finding data underpinning the at least one of the one or more threat type-specific content automations.

In one embodiment, the method further includes displaying, on a web-based user interface, the cybersecurity event-specific reporting artifact to the subscriber associated with the cybersecurity event.

In one embodiment, the method includes wherein one of the one or more threat-type specific content automations of the digital cybersecurity artifact includes a subscriber digital asset-to-threat node automation that, when executed constructs one or more representations of subscriber digital assets affected by the cybersecurity event, one or more representations of malicious threat nodes causing the cybersecurity event, and one or more graphical edges, wherein each of the one or more graphical edges visually connects a distinct representation of the one or more representations of subscriber digital assets to the one or more representations of malicious threat nodes.

In one embodiment, the method further includes mitigating, via one or more mitigation actions, a subset of malicious threat nodes based on the one or more representations of malicious threat nodes.

In one embodiment, the method further includes updating one of the one or more threat type-specific content automations of the cybersecurity event-specific reporting artifact based on the cybersecurity event detection and response service identifying additional digital event data relevant to the cybersecurity event.

In one embodiment, the method further includes augmenting the cybersecurity event-specific reporting artifact to include an additional threat type-specific automation distinct from the one or more of threat type-specific automations of the digital cybersecurity artifact based on the additional digital event data.

In one embodiment, a method for automatically generating a digital cybersecurity artifact for accelerating a reporting of a cybersecurity event, the method comprising: selectively executing an automated cybersecurity investigation workflow based on cybersecurity event associated with a subscriber, wherein an output of the automated cybersecurity investigation workflow includes a generation of one or more corpora of investigation findings data in response to executing the automated cybersecurity investigation workflow; selectively instantiating a digital cybersecurity artifact based on a cybersecurity threat type of the cybersecurity event, wherein the digital cybersecurity artifact includes a plurality of distinct regions comprising one or more threat type-specific content automations that relate to the probable cybersecurity threat type that, when executed, install investigation findings data into the plurality of distinct regions of the digital cybersecurity artifact with selective subsets of investigation findings data of the one or more corpora of investigation findings data; and generating a cybersecurity event-specific reporting artifact, wherein the generating of the cybersecurity event-specific reporting artifact includes installing investigation findings data into the plurality of distinct regions of the digital cybersecurity artifact with the selective subsets of the investigation findings data of the one or more corpora of investigation findings data.

BRIEF DESCRIPTION OF THE FIGURES

FIG. 2 illustrates an example method 200 in accordance with one or more embodiments of the present application;

FIG. 4 illustrates an example cyber incident storyboard in accordance with one or more embodiments of the present application; and FIG. 5 illustrates an example cyber incident storyboard in accordance with one or more embodiments of the present application.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Remote Cyber Security Operations & Automated Investigations

Figure 1:
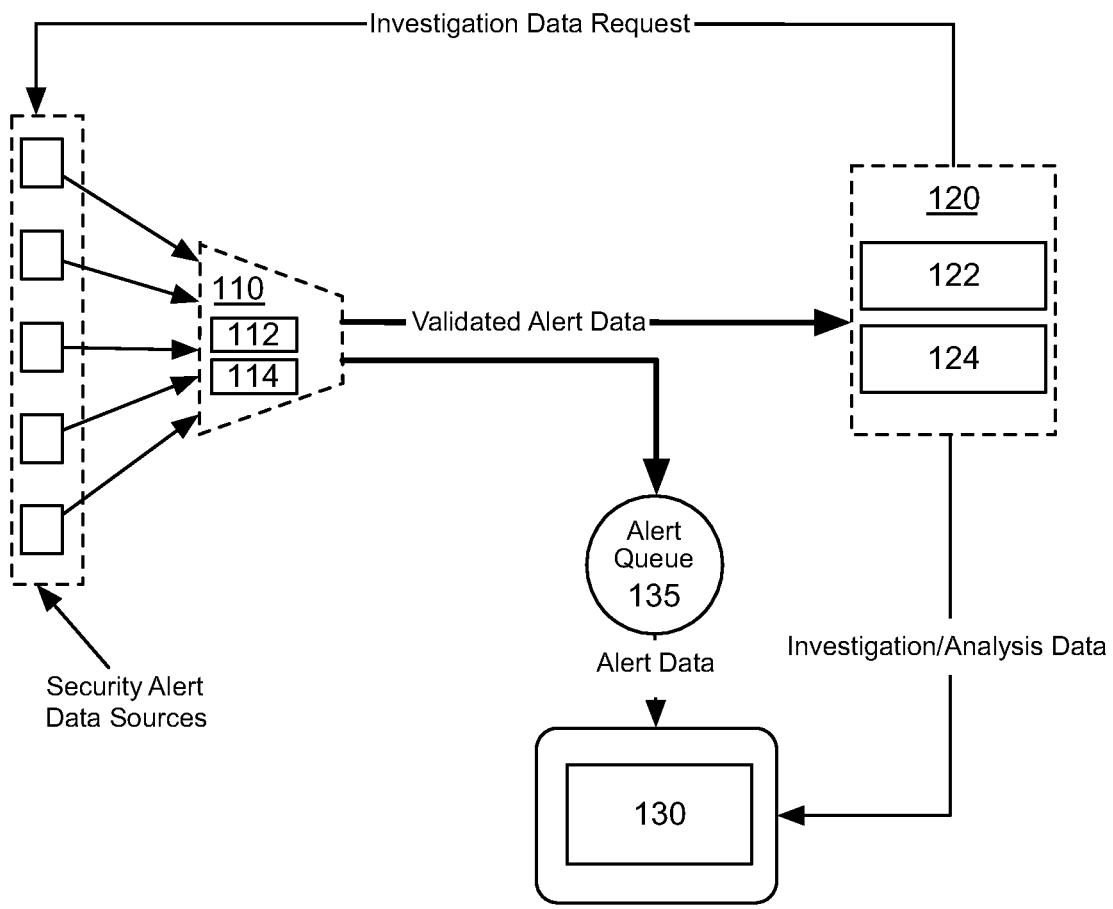
FIG. 1 illustrates a schematic representation of a system 100 in accordance with one or more embodiments of the present application.

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100 or a cybersecurity event detection and response service.

The system 100 may function to enable real-time cybersecurity threat detection, agile, and intelligent threat response for mitigating detected security threats.

1.1 Security Alert Engine

The security alert aggregation and identification module 110, sometimes referred to herein as the "security alert engine 110" may be in operable communication with a plurality of distinct sources of cyber security alert data. In one or more embodiments, the module 110 may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine 110 may include a security threat detection logic module 112 that may function to assess inbound security alert data using predetermined security detection logic that may validate or substantiate a subset of the inbound alerts as security threats requiring an escalation, an investigation, and/or a threat mitigation response by the system 100 and/or by a subscriber to the system 100.

Additionally, or alternatively, the security alert engine 100 may function as a normalization layer for inbound security alerts from the plurality of distinct source of security alert data by normalizing all alerts into a predetermined alert format.

1.1.1 Security Alert Machine Learning Classifier

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 and/or the security alert engine 110 may be dynamically updated to include additional or to remove one or more of the plurality of distinct investigation instructions/scripts or investigation rules.

1.3. Security Mitigation User Interface

The security mitigation user interface 130 may function to enable an analyst or an administrator to perform, in a parallel manner, monitoring, investigations, and reporting of security incidents and resolutions to subscribers of the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible to a subscribing entity.

Accordingly, in one or more embodiments, a system user (e.g., an analyst) or an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

2. Method for Automated Investigations and Intelligent Investigation Storyboards for System-Validated Security Alerts As shown in FIG. 2, a method 200 for automating cybersecurity investigations and system-generating incident-specific investigation storyboards includes identifying event data signals S210, generating and triaging system-validated security alerts S220, identifying and executing an automated investigation workflow S230, instantiating an intelligent investigation storyboard S240, and generating an incident-specific investigation storyboard S250.

It shall be noted that for one or more steps of the method 200, reference is made to U.S. patent application Ser. No. 17/488,800, filed on 29 Sep. 2021, titled SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM, which is incorporated herein in its entirety by this reference.

2.1 Identifying Event Data Signals

S210, which includes identifying event data signals, may function to identify alert data and/or event data from one or more distinct security or technology data sources. In a preferred embodiment, S210 may function to collect and/or receive alert data and/or event data involving digital/computing assets of subscribing entities, including, but not limited to, one or more computing resources, computer network resources, data resources, cloud-based resources, any computer accessible digital entity or device, and/or the like.

In one or more embodiments, the one or more distinct data sources may include one or more third-party web-based security services and/or one or more digital services (e.g., an on-network security agent) implemented/operating on one or more systems (or networks) of the subscriber. For example, S210 may function to periodically request or generate application programming interface (API) calls to each of the one or more distinct data sources for providing data signals (e.g., alert data, event data, etc.) to a system (e.g., the system 100 implementing the method 200). Additionally, or alternatively, via an intelligent data source and service system (e.g., the system 100), S210 may function to receive automatic pushes of data signals (e.g., alert data, event data, combinations thereof, etc.) from the one or more distinct data sources to the system 100.

In one or more embodiments, the event data and/or security alert data (e.g., data signals) produced by the one or more distinct data sources may include, but should not be limited to, vendor alert data, continuous telemetry data, subscriber data, investigative data, third-party alert data, event data, event logs, data occurring with or involving internal computing networks or resources of a subscriber, other data and/or the like.

Accordingly, in one or more embodiments, the data signals generated from the one or more distinct security data sources may be processed through an automated security alert engine (e.g., the security alert engine 110) that may or may not produce system-validated security alerts. In other words, S210 may function to identify data signals (e.g., third-party alerts or event data) that may be of a probable security threat and may also identify data signals that may not be of a likely security threat.

2.2 Generating System-Validated Security Alerts

S220, which includes generating system-validated security alerts, may function to automatically pass data signals collected or sourced by S210 through an automated security alert engine to generate system-validated security alerts. In a preferred embodiment, S220 may function to implement an automated security alert engine that may automatically source (event) data signals identified by S210, process the (event) data signals through the automated security alert engine, and generate and/or publish system-validated security alerts (or likely security alerts) based on the processing of the (event) data signals.

In one or more embodiments, the automated security alert engine may be in web-based communication or any other known electronic communication with a plurality of distinct data sources (e.g., the plurality of distinct data sources may be the subject of cybersecurity protection sought by the subscriber) and/or a plurality of distinct event data. For example, the system (e.g., the system 100) and, in particular, the automated security alert engine may function to receive a large volume (e.g., exceeding a threshold value) of (event) data signals from (or generated from) the plurality of distinct data sources via any known API method, web-based communication method, or the like.

In one or more embodiments, in response to receiving (or identifying) a plurality of data signals, S220 may function to distill, rank, triage, and/or filter the plurality of data signals into one or more system-validated security alerts via the automated security alert engine. A system-validated security alert, as generally referred to herein, may relate to one or more identified data signals (e.g., alert data, event data, etc.) that may have been processed through the automated security alert engine (e.g., the security alert engine 110) and published (or identified) by the system (e.g., the system 100) and/or the method 200 as valid (e.g., not a false-positive, initially appears to be a security threat, initially appears to look malicious, etc.). In a non-limiting example, a system-validated security alert, in some embodiments, may be structured as a container to include a collection of multiple data signals.

In operation, S220 may function to distill, rank, triage, and/or filter large volumes of data signals (e.g., a plurality of data signals, a plurality of alert data, a plurality of event data, a plurality of alert data and a plurality of event data, etc.) generated from the plurality of distinct data sources into smaller subsets of system-validated security alerts based on one or more system security escalation criterions, one or more subscriber security escalation criterions, one or more security event criterions, one or more system alert labels (e.g., type of attack activity, type of severity, type of attack vector, type of alert, type of threat, etc.), and/or one or more security alert validations. In such operation, the security event criterion and/or the system alert labels (e.g., type of attack activity, type of attack severity, type of attack vector, type of alert, type of threat, etc.) may be determined by a plurality of distinct, predetermined security threat identification heuristics or rules that may govern the operations of the automated security alert engine.

Accordingly, the identified data signals (along with its respective metadata attributes and/or corresponding characteristics) may be inputted into and/or accessed by the automated security alert engine to be evaluated against predetermined security threat identification heuristics or rules capable of detecting and/or mapping the inputted data signals to a respective security (or investigation) workflow (e.g., electronic messaging compromise workflow, phishing workflow, suspicion login workflow, ransomware workflow, malware workflow, etc.) based on (computed) security activity or a computed cybersecurity threat type label (e.g., electronic messaging compromise, phishing, suspicion login, ransomware, malware, etc.).

Stated differently, in one or more embodiments, the automated security alert engine may function to implement one or more of security escalation criteria, security event criteria, and a security alert validation algorithm. In such embodiments, the security alert engine may implement security event criteria that includes a plurality of distinct, predetermined security threat identification heuristics or rules. Accordingly, alert data and/or event data (e.g., collected data signals) may be evaluated against the predetermined security threat heuristics and if the alert data and/or the event data matches, satisfy, or otherwise, triggers a predetermined security rule, S220 may function to generate a system-validated security alert and pass or route the system-validated security alert to one or more downstream cybersecurity handling processes. That is, the automated security alert engine may function to automatically determine for inputted data signals whether or not each of the inputted (e.g., event) data signals appears to be malicious and/or the cybersecurity activity type (e.g., electronic messaging compromise, phishing, suspicion login, ransomware, malware, etc.).

Additionally, or alternatively, in response to the automated security alert engine determining that one or more of the inputted data signals may be potentially malicious, the system (e.g., the system 100 implementing the method 200) may automatically promote the subject (e.g., event) data signal (and now a system-validated security alert) to one of an investigation severity level ("investigation-level") or incident severity level ("incident-level") based on the computed severity or the computed cybersecurity activity type (e.g., attack vector type, type of activity, type of threat or the like).

Accordingly, in some embodiments, S220 may function to pass system-validated security alerts automatically produced or validated by the security alert engine to one or more downstream processes or operations that may preferably include utilizing an automated investigations engine. It shall be noted that S220 may function to process (or provide) the one or more system-validated security alerts to the automated investigations engine contemporaneously or at a same time to enable parallel processing and/or investigation of the one or more system-validated security alerts.

2.3 Identifying and Executing Automated Investigation Workflows

S230, which includes identifying and executing automated investigation workflows, may function to identify an automated investigation workflow based on one or more characteristics (or attributes) of a target system-validated security alert and execute the identified automated investigation workflow. In a preferred embodiment, S230 may function to selectively identify and execute an automated investigation workflow of a plurality of distinct automated investigation workflows for automatically handling one or more portions of a cybersecurity investigation of a target system-validated security alert that may have been escalated to an investigation (threat severity) level.

An automated investigation workflow may comprise a sequence and/or a collection of distinct investigative actions, distinct investigation automations, distinct investigative queries or investigative subroutines, that when executed, may perform one or more automated investigative tasks including, but not limited to, automatically sourcing security investigation data, automatically routing, and automatically constructing one or more investigation response resources for successfully supporting a decisioning and/or disposal of a target validated security alert. The collection of investigative actions, investigative queries, and/or investigative subroutines may be preprogrammed (and/or automated) investigation requests according to a respective automated investigation workflow (e.g., electronic messaging compromise workflow, phishing workflow, suspicion login workflow, ransomware workflow, malware workflow, etc.) that, when executed, may provide greater context and/or explanation to the overall story of a subject system-validated security alert. In other words, S230 may function to construct or generate one or more investigation queries to one or more data sources (of a subscriber) based on the one or more investigation scripts or rules that may define data criteria and/or data requirements for a given cybersecurity threat type of the validated security alert.

In one or more embodiments, a distinct automated investigation workflow may be defined for each recognized and/or distinct threat type classification or category of a system-validated security alert. In such embodiments, each class or distinct type of system-validated security alert may be mapped or electronically linked to a distinct automated investigation workflow in a reference table or any other suitable data structure. For instance, a first system-validated security alert type or distinct threat type classification may be mapped to a first (set of) automated investigation workflow(s) and a second system-validated security alert type or distinct threat type classification may be mapped to a second (set of) automated investigation workflow(s) that may be specifically configured for automatically performing one or more investigative tasks for handling or supporting a security investigation.

In one or more embodiments, S230 may function to automatically query and/or probe one or more of a plurality of distinct subscriber data sources for obtaining investigation findings data relating to the system-validated security alert. In such embodiments, S230 may function to automatically execute one or more investigation workflows that may automatically construct or system-generate investigative queries to one or more of the plurality of distinct data sources of the subscriber associated with the system-validated security alert based on preprogrammed (and/or automated) requests of the one or more automated investigation workflows. The returned data to the investigative queries (e.g., investigation findings data) may be used as input for automatically generating explanatory content artifacts (or content automations) for a security analyst and/or the subscriber. That is, a service or system (e.g., the system 100 implementing the method 200) may function to implement an automated security investigation engine that may selectively execute an automated investigation workflow based on a cybersecurity threat type and the output (e.g., selective subsets of investigation findings data) of the executed automated investigation workflow may be used as input for system-generating one or more content artifacts or one or more content automations.

Figure 3:
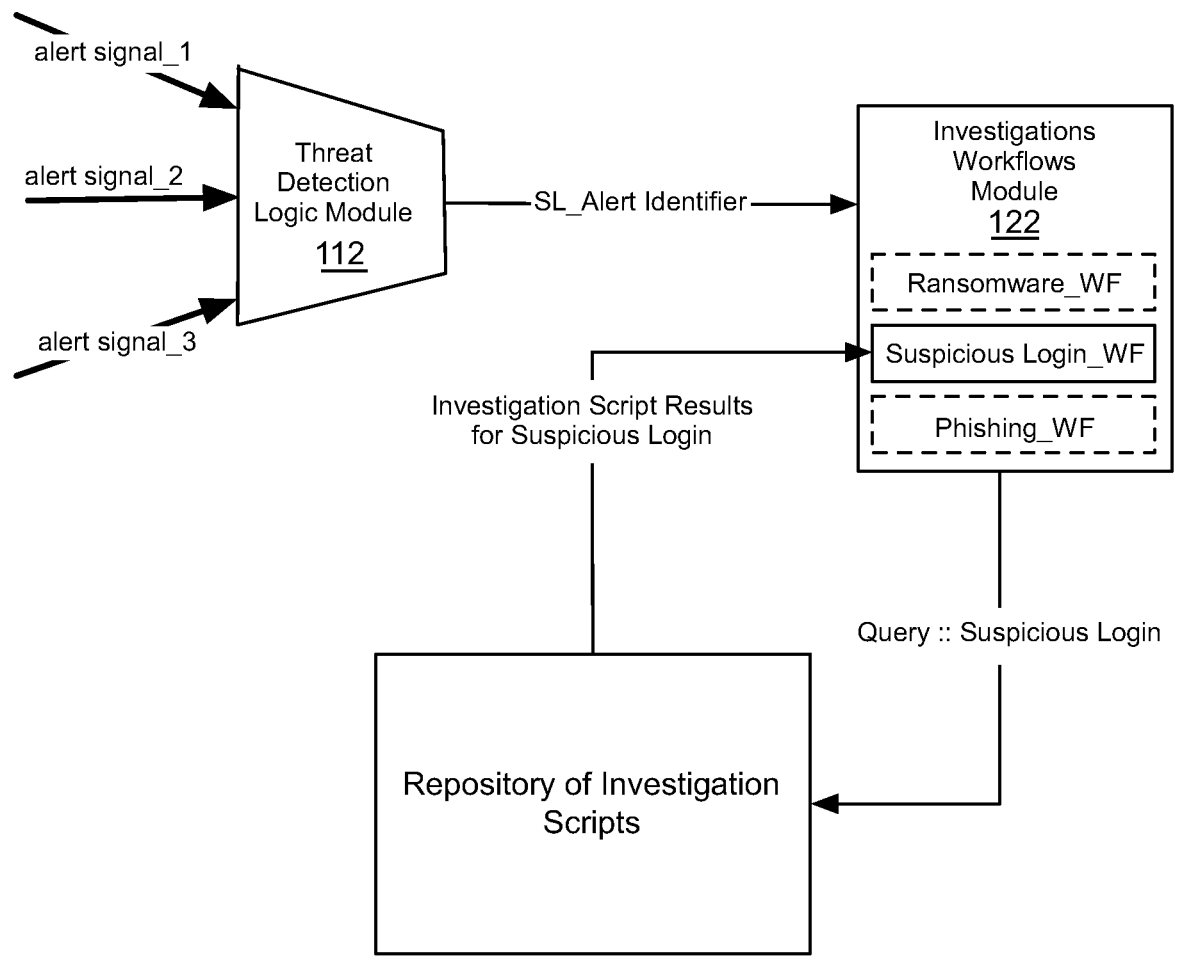
FIG. 3 illustrates a schematic representation of a first implementation of one or more sub-components of the system 100 in accordance with one or more embodiments of the present application.

Accordingly, in one or more embodiments, S230 may function to discover a set of investigation instructions based on performing a search of an investigation instructions or rules repository using data and/or cybersecurity threat type identifier data associated with a system-validated security alert, as shown by way of example in FIG. 3. For instance, the automated investigation workflow may include an investigation action that includes submitting to an investigative instructions repository an investigation search query comprising a security alert identifier (e.g., suspicious login, etc.) that seeks to find and return all investigation instructions or tasks that may include a metadata tag of "suspicious login". The investigative instructions may be quarriable programming syntax (or quarriable programming scripts) to automatically search one or more of the distinct data sources involving the system-validated security alert.

Corpus of Investigation Findings Data

In one or more embodiments, S230 may function to collect and store the investigation findings data associated with returned responses to the one or more API calls or investigative queries. In such embodiments, S230 may function to compile the investigation findings data into one or more corpora of investigation findings data with a unique threat identifier associated with a target system-validated security alert.

Additionally, in one or more embodiments, S230 may function to automatically construct rationale and supporting artifacts/content-documentation (e.g., a plurality of textual-based finding automations and/or a plurality of graphical-based finding automations, a plurality of threat-type specific content automations) based on one or more pieces or subsets of investigation findings data of the one or more corpora of investigation findings data, which may be used in a determination of escalating the system-validated security to an incident-level or de-escalating the system-validated security alert.

2.35 Incident-to-Intelligent Subscriber Notifications

S230 optionally includes S235, which includes incident-to-intelligent subscriber notifications, may function to provide intelligent incident notifications and/or provide automated system-generated remediation support to target subscribers of system-validated security alerts exceeding a target severity level. In a preferred embodiment, in response to a (cyber) security investigation of a system-validated security alert causing an escalation of the system-validated security alert to a (cyber) incident level, S235 may function to provide instant (e.g., near real-time) notifications or updates (of the system-validated security alert) to a target subscriber through one or more third-party messaging applications. That is, in response to the system (e.g., the system 100 implementing the method 200) identifying the system-validated security alert as confirmed malicious activity (e.g., an incident), S235 may function to intelligently notify the subscriber and optionally provide automated (or system-generated) remediation recommendations to mitigate the cybersecurity threat. In some embodiments, the remediation recommendations may be included in a digital cybersecurity artifact as described in more detail in S240 and S250.

In one or more embodiments, in response to the system and/or the method 200 detecting a system-validated security alert as a cyber incident, S235 may function to provide alert notification via a third-party messaging medium to keep the subscriber informed regarding the environmental state of the subscriber's system. In one or more embodiments, the system 100 implementing a third-party messaging medium may function to notify the subscriber contemporaneously with an (e.g., ongoing) investigation to enable parallel communication to the subscriber while continuing the ongoing investigation of the cyber incident.

Accordingly, S235 may function to automatically provide notifications or informative messages to subscriber(s) at target stages, such as (but not an exhaustive list of) during the initial discovery of the incident, suggested (or proposed) remediation actions, suggested (or proposed) resilience actions, overview of the incident, further suggested (or proposed) remediation actions based on the overview of the incident, and a summary of the incident.

In a non-limiting example, the initial discovery message may include an overview of the incident (e.g., a brief introduction of the incident). The suggested remediation action message may include one or more proposed remediation action recommendations associated with the incident (e.g., one or more proposed system-generated remediation actions and/or one or more proposed analyst-generated remediation actions) (e.g., reset log-in credentials for an effected individual, block the internet protocol (IP) address of the attacker, or the like). The overview of the incident message may include new information or details regarding the incident that may not have been readily available during the initial discovery message. The further remediation actions message may include additional proposed remediation recommendations based on the "new information" of the overview of the incident message. The summary of the incident message may include a summary of the entire story (or timeline) of the incident from what initially triggered the alert, the details associated with the alert, the suggested remediation actions, and/or any resiliency recommendations to prevent this type of incident from occurring in the future.

It shall be noted that actively notifying or messaging the subscriber through one or more third-party messaging applications may include utilization of one or more third-party messaging services/channels (e.g., Microsoft Teams, Slack, Email, Pager Duty, etc.).

2.4 Instantiating Intelligent Investigation Storyboards-|Sourcing and Generating Digital Cybersecurity Artifacts S240, which includes instantiating intelligent investigation storyboards, may function to source and/or instantiate an intelligent investigation storyboard based on a likely or probable threat type of a target system-validated security alert. An intelligent investigation storyboard (or digital cybersecurity artifact), as generally referred to herein, may be a subscriber-facing digital event reporting template that may include a plurality of distinct regions that may be digitally mapped to one or more threat type-specific content automations specifically designed for communicating investigation findings data of a distinct system-validated security alert type to a target subscriber. In one or more embodiments, S240 may function to selectively source and/or (e.g., automatically) instantiate an investigation storyboard from a plurality of investigation storyboards based on a threat type of a target system-validated security alert.

In a first implementation, a distinct (intelligent) investigation storyboard may be defined for each recognized and/or distinct threat type classification or category of a system-validated security alert. In such implementation, via a reference table or any suitable data structure, each class or distinct type of system-validated security alert may be mapped or electronically linked to a distinct intelligent investigation storyboard that may be digitally mapped to a plurality of threat type-specific content automations. For instance, a first system-validated security alert type or distinct threat type classification may be mapped to a first (set of) investigation storyboard(s), which may also be referred to herein as "digital cybersecurity artifact(s)", and a second system-validated security alert type or distinct threat type classification may be mapped to a second (set of) investigation storyboard(s) or digital cybersecurity artifact(s) that may be specifically configured to communicate investigation findings data relating to a target cybersecurity event. It shall be noted that, in one or more embodiments, each sourced or instantiated investigation storyboard or cybersecurity digital artifact may include a plurality of distinct regions digitally mapped to one or more threat-type specific automations, and preferably include a plurality of (e.g., prefabricated) threat-type specific automations that may be specifically designed to present investigation findings data of an investigation corresponding to a subject system-validated security alert to a target subscriber. In other words, in some embodiments, a sourced or instantiated digital cybersecurity artifact may include a plurality of distinct regions digitally mapped to one or more threat type-specific content automations that, when executed, install and/or present investigation findings data into the plurality of distinct regions with selective subsets of investigation findings data.

Accordingly, in one or more embodiments of the first implementation, in response to an escalation of a system-validated security alert to a (cyber) incident level (e.g., from an investigation level to a cyber incident level, from a system-validated security alert to a cyber incident level), S240 may function to automatically source (or trigger or cause a system-generated spin-up or intelligent creation) of a (e.g., pre-fabricated) electronically-accessible investigation storyboard that may include (e.g., digitally mapped to) a plurality of threat-type specific automations based on performing a search of the reference mapping data structure using the cybersecurity threat type of the subject system-validated security alert. In such embodiments, the sourced (or identified or detected) intelligent investigation storyboard may be initialized or instantiated in a dynamic console and/or a dynamic digitally accessible interface of the cybersecurity event detection and response service.

Additionally, or alternatively, in a second implementation, a set of threat type-specific automations may be defined for each recognized and/or distinct threat type classification or category of a system-validated security alert. In such embodiments, via a reference table or any suitable data structure, each class or distinct type of system-validated security alert may be mapped or electronically linked to a set of threat type-specific automations. For instance, in one or more embodiments of the second implementation, a first system-validated security alert type or distinct threat type classification may be mapped to a first (set of) threat type-specific automation(s) and a second system-validated security alert type or distinct threat type classification may be mapped to a second (set of) threat type-specific automation(s) that may be specifically configured to communicate (e.g., present, pictorially communicate, etc.) investigation findings data relating to a distinct system-validated alert type (or cyber incident type). In other words, a set of threat-specific content automations may be defined for each recognized and/or distinct threat type classification or category of a system-validated security alert (or cyber incident type).

Accordingly, in one or more embodiments of the second implementation, S240 may function to source (or instantiate) a non-threat type specific investigation storyboard that may include a plurality of customizable regions. Each of the plurality of customizable regions may be modified to include one or more system-determined content automations (e.g., one or more threat type-specific textual-based content automations and/or one or more threat type-specific graphical-based content automations) such that the one or more system-determined content automations may be selected by the system 100 and/or the method 200 to provide the most suitable content automations salient to the comprehension of the cyber incident to the subscriber. In other words, S240 may function to spin up a non-threat type specific investigation storyboard (e.g., non-threat specific cybersecurity reporting artifact) and install (or encode or digitally map) a subset of the mapped or electronically linked threat type-specific content automations to one or more of the plurality of customizable regions of the non-threat type specific investigation storyboard based on a subject system-validated security alert and/or investigation findings data corresponding to the subject system-validated security alert.

Additionally, or alternatively, in a third implementation, a set of threat type-specific (content) automations and/or a distinct investigation storyboard may be defined for each recognized and/or distinct class of remediation actions (e.g., a remediation action (e.g., reset password, implement a DNS sinkhole for a target IP address, contain and reimage a compromised host, etc.) may be proposed or suggested by an analyst or automatically proposed by the system to mitigate a system-validated security alert). In one or more embodiments, via a reference table or any suitable data structure, each class or distinct type of remediation action may be mapped or electronically linked to a set of threat type-specific automations. For instance, in one or more embodiments of the third implementation, a first remediation action type or distinct remediation classification may be mapped to a first (set of) threat type-specific automations and a second remediation action type or distinct remediation classification may be mapped to a second (set of) threat type-specific automations that may be specifically configured to communicate investigation findings data or remediation findings data (e.g., proposed remediation actions, etc.) to support or aid in a mitigation of a target system-validated alert (of a cyber incident severity level). In other words, a set of threat type-specific automations may be defined for each recognized and/or distinct remediation type classification or category of remediation actions.

In one or more embodiments of the third implementation, S240 may function to automatically source (or trigger or cause a system-generated spin-up or intelligent creation) of a (e.g., pre-fabricated) electronically-accessible investigation storyboard that may include a plurality of threat-type specific content automations based on performing a search of a reference mapping data structure using one or more remediation actions (or remediation action identifiers) that may have been (e.g., previously) proposed to the subscriber to mitigate a subject system-validated security alert. In such embodiments, the sourced (or identified or detected) intelligent investigation storyboard (based on the search) may be initialized or instantiated in a dynamic console and/or a dynamic digitally accessible interface of the cybersecurity event detection and response service.

Summary-Based Findings Automation

In one or more embodiments, S240 may function to source or instantiate an intelligent investigation storyboard that may include a region digitally mapped to a summary-based findings automation. In such embodiments, the summary-based findings automation of the sourced intelligent investigation storyboard may be in an extensible (or foundational or skeletal state) that, when executed, may augment the summary-based findings automation (or the region digitally mapped to the summary-based findings automation) to include investigation findings data specific to (or required by) the summary-based findings automation. In one or more embodiments of a summary-based findings automation, the summary-based findings automation may include one or more prefabricated textual sentences that may be designed for slot filling to explain and/or provide a textual overview (e.g., origin, timing, and scope of the incident, etc.) to a target subscriber associated with a target (cyber) incident or a target system-validated security alert.

In a non-limiting example, a prefabricated sentence of a summary-based findings automation of an electronic messaging compromise incident type may include one or more dynamic text slots and one or more static text strings, such as "On [DATE], at [TIME], [SECURITY SIGNAL] detected electronic messaging compromise activity involving [USER EMAIL], originating from [IP ADDRESS]." The slots "DATE", "TIME", "SECURITY SIGNAL", and "USER EMAIL" may be sourced or collected for a particular cyber incident by accessing one or more corpora of investigation findings data or system-validated security alert data as described in more detail in S250. Accordingly, in such non-limiting example, in response to sourcing or collecting slot-filling values from the one or more corpora of investigation findings data or the subject system-validated security alert data, the summary-based findings automation may be dynamically and automatically generated based on slot filling, such as "On May 4, 2020, at 17:59:33 UTC, Azure AD Identity Protection detected electronic messaging compromise activity involving John.Doe@widgetcorp.com, originating from 101[.]67[.]20[.]91."

In another non-limiting example, one or more prefabricated sentences of a summary-based findings automation for a commodity malware-type incident may be "On [DATE], at [TIME], [SECURITY SIGNAL] detected activity consistent with the installation of non-targeted commodity malware on [HOSTS INVOLVED]. The malware was configured to communicate with the command-and-control (c2) domains/IP address: [IP ADDRESS AND DOMAIN]." The slots "DATE", "TIME", "SECURITY SIGNAL", "HOSTS INVOLVED", and "IP ADDRESS AND DOMAIN" may be obtained or identified or retrieved on a per cyber incident basis by accessing one or more corpora of investigation findings data and/or system-validated security alert data. In such non-limiting example, in response to receiving the one or more slots from the one or more corpora of investigation findings data and/or the subject system-validated security alert data, the slots may be dynamically filled into the one or more prefabricated sentences, such as "On Feb. 11, 2021, at 15:44:18 UTC, CrowdStrike Falcon detected activity consistent with the installation of non-targeted commodity malware on HOST1234 and HOST4567. The malware was configured to communicate with the command-and-control (c2) domains/IP address: prem.threat1.xyz, kill.threat2.xyz, and 110[.]110[.]11[.]00."

User Login Activity Automation|Login-to-Location Graphical Automation

Additionally, or alternatively, in one or more embodiments, S240 may function to source or instantiate an intelligent investigation storyboard that may include a region digitally mapped to a login-to-location automation (e.g., a graphical-based user login activity automation). A login-to-location automation that, when executed, may be a graphical or illustrative schematic that may visually (e.g., pictorially) present or illustrate one or more of geographical locations of successful logins, geographical locations of unsuccessful logins, and a geographical location of a target cyber incident superimposed on a geographical world map for a predetermined time period (e.g., geographical locations of login activity for past thirty days). In such embodiments, a sourced login-to-location automation may be programmatically configured to identify (e.g., install, receive, source, combinations thereof, etc.) investigation findings data required by the login-to-location automation on a per cyber incident basis or per event basis to a distinct region of the instantiated intelligent investigation storyboard.

Accordingly, in response to installing investigation findings data into a distinct region of a sourced intelligent investigation storyboard (or the login-to-location automation), the login-to-location automation may be dynamically or automatically configured to graphically (or illustratively) present the installed investigation findings data (on the intelligent investigation storyboard) via the login-to-location graphical automation. It shall be noted that the investigation findings data that may be installed into a distinct region of the sourced intelligent investigation storyboard (or the login-to-location automation) may include, but not limited to, geographical location data of where successful logins may have occurred, geographical location data of where unsuccessful logins may have occurred, and/or geographical location data corresponding to a location of the subject (cyber) incident. In operation, in response to receiving (or installing) location-based login activity data (e.g., investigation findings data), the login-to-location graphical automation may visually indicate, via one or more user interface elements on the intelligent investigation storyboard, the location of where successful logins, unsuccessful logins, and a target cyber incident may have occurred on the geographical world map for a target user account corresponding to a target system-validated security alert.

User Authentication Histogram Automation|Login-to-Time Graphical Automation

Additionally, or alternatively, in one or more embodiments, S240 may function to source or instantiate an intelligent investigation storyboard that may include a region digitally mapped to a successful login-to-time automation (e.g., user authentication histogram automation). A successful login-to-time automation that, when executed, may be a graphical or illustrative schematic that may (e.g., pictorially) illustrate a frequency or a magnitude of successful user login attempts with respect to a time of day (e.g., login hour) for a predetermined period of time (e.g., time-based login activity for past thirty days). In such embodiments, a sourced login-to-time automation that, when executed, may be programmatically configured to identify (e.g., install, receive, source etc.) investigation finding data required by the login-to-time automation (on a per cyber incident basis) to a distinct region of the instantiated intelligent investigation storyboard.

Accordingly, in response to installing investigation findings data into a distinct region of a sourced intelligent investigation storyboard (or the login-to-time automation), the login-to-time automation may be dynamically or automatically configured to (e.g., pictorially) present the installed investigation finding data (on the intelligent investigation storyboard) via the login-to-time graphical automation. It shall be noted that the investigation finding data that may be installed into a distinct region of the sourced intelligent investigation storyboard (or the login-to-time automation) may include, but not limited to, time-based data of when successful logins occurred. In operation, in response to receiving (or installing) time-based successful login activity data, the login-to-time graphical automation may visually indicate, via a chart-type interface element on the intelligent investigation storyboard, a frequency (or count) of successful logins for a target user account corresponding to the target cyber incident with respect to a time of day (e.g., hours of the day), as shown generally by way of example in FIG. 4.

Attack Diagram Automation|Digital Asset-to-Threat Node

Additionally, or alternatively, in one or more embodiments, S240 may function to source or instantiate an intelligent investigation storyboard that may include a region digitally mapped to a digital asset-to-threat node automation (e.g., an attack diagram automation). A digital asset-to-threat node automation that, when executed, may be a graphical or illustrative schematic that may illustrate a cybersecurity relationship between digital assets of a target subscriber and threat nodes in communication with the digital assets of the target subscriber. In such embodiments, a sourced digital asset-to-threat node automation may be programmatically configured to identify (e.g., install, receive, source etc.) investigation findings data required by the digital assets-to-threat node automation on a per cyber incident basis to a distinct region of the instantiated intelligent investigation storyboard.

Figure 5:
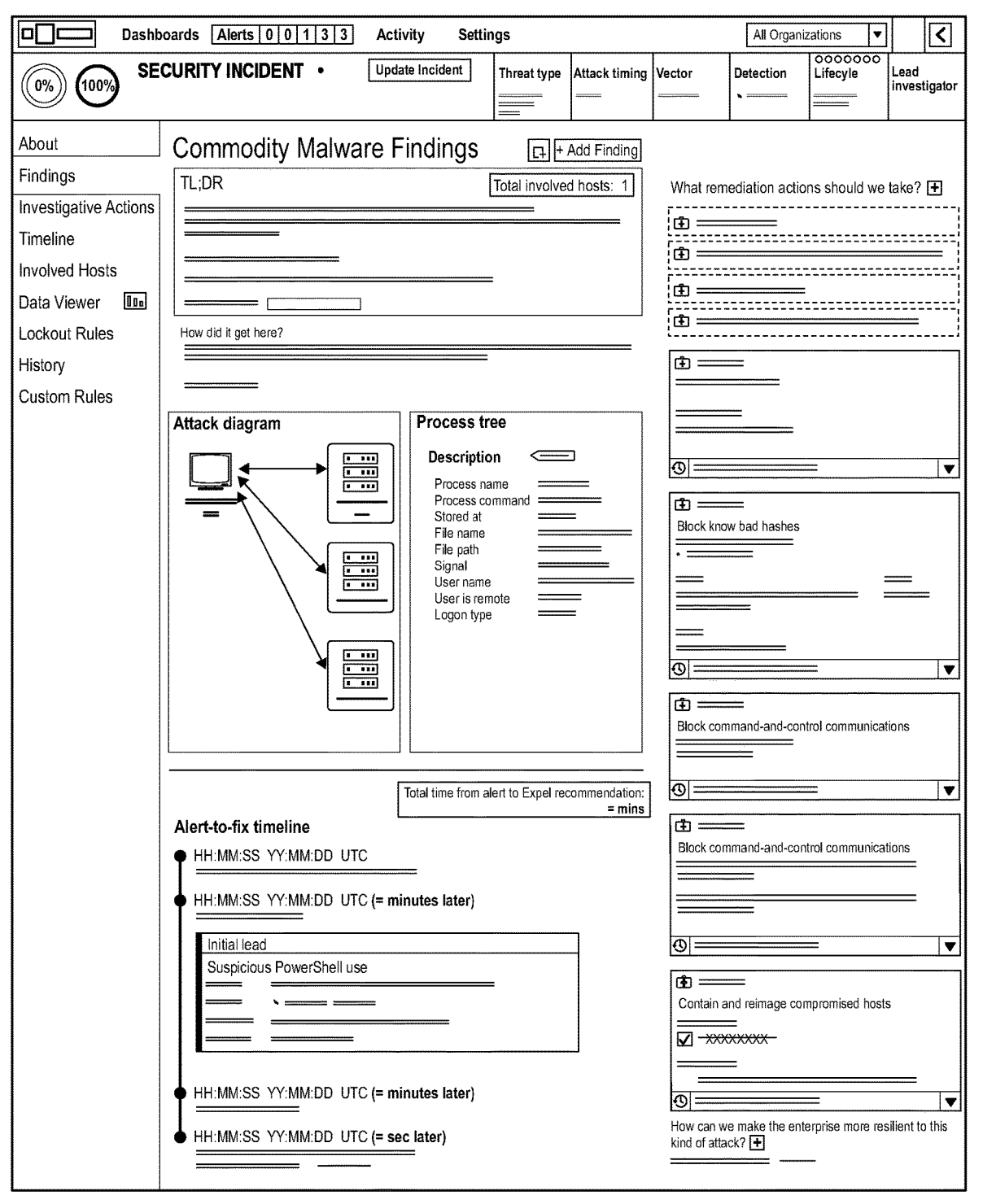

Accordingly, in response to installing investigation findings data into a distinct region of a sourced intelligent investigation storyboard (or into the digital asset-to-threat node automation), the digital asset-to-threat node automation may be dynamically or automatically configured to (e.g., pictorially) present the installed investigation findings data (on the intelligent investigation storyboard) via the digital asset-to-threat node graphical automation, as shown generally by way of example in FIG. 5. For example, in response to installing (or receiving) the investigation findings data, the digital asset-to-threat node automation may automatically construct a graphical schematic (displayed on the intelligent investigation storyboard) that includes one or more graphical representations of affected digital assets of the subscriber relating to the cybersecurity event (e.g., a representation of an affected computer workstation, a host account, etc.), one or more graphical representations of malicious threat nodes causing the cybersecurity event (e.g., malicious IP addresses, command and control (C2) domains), and one or more graphical edges that represents a connection (or link) between a distinct representation of the one or more digital assets of the subscriber and the one or more distinct representation of malicious threat nodes.

It shall be noted that the investigation findings data that may be installed into a distinct region of the sourced (or instantiated) intelligent investigation storyboard (or the digital asset-to-threat node automation) may include, but not limited to, digital asset data corresponding to a target cyber incident and threat node data that may have resulted in a compromised digital asset.

Alert-to-Fix Timeline Automation

Figure 4:
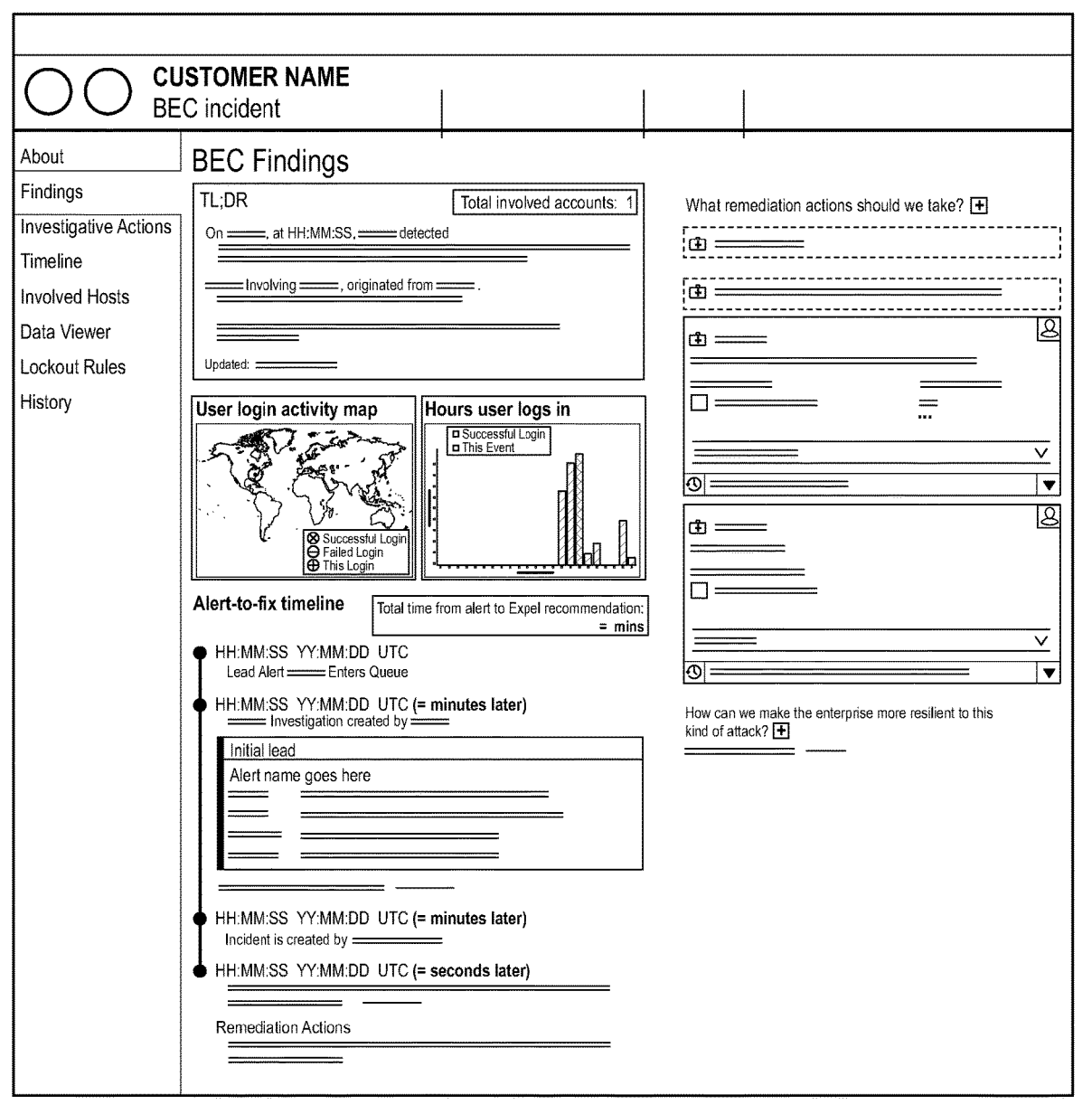

Additionally, or alternatively, in one or more embodiments, S240 may function to source (or instantiate) an intelligent investigation storyboard that may include a region digitally mapped to an alert-to-fix timeline automation, as shown generally by way of example in FIG. 4. An alert-to-fix timeline automation that, when executed, may be a graphical schematic that may visually display a sequence of distinct investigation stages (with respect to time) for a target cyber incident, including, but not limited to, identification of the data signal, commencement of promoting the data signal to an investigation level, commencement of promoting the data signal to a cyber incident (threat severity) level, and/or identification of remediation actions. It shall be noted that, a sourced alert-to-fix timeline automation may be programmatically configured to identify (e.g., install, receive, source etc.) investigation findings data required by the alert-to-fix timeline automation on a per cyber incident basis (e.g., a target system-validated security alert escalated to an incident threat severity level) to a distinct region of the instantiated intelligent investigation storyboard.

In one or more embodiments, each distinct stage in an alert-to-fix timeline automation may include a time-based text string and a corresponding explanation text string that may describe the time-based text string. For example, a first stage in an alert-to-fix timeline automation may include a time-based text string (e.g., HH:MM:SS YY:MM:DD UTC) that may correspond to when the system 100 and/or the method 200 may have identified a data signal that eventually resulted in a cyber incident and an explanation text string that may textually describe the time-based text string of the first stage (e.g., Lead Alert Enters Alert Queue), a second stage in an alert-to-fix timeline automation may include a time-based text string (e.g., HH:MM:SS YY:MM:DD UTC) that may correspond to when the identified data signal may have initiated (or caused) a security investigation and an explainable text string that may textually describe the time-based text string of the second stage, a third stage in an alert-to-fix timeline automation may include a time-based text string (e.g., HH:MM:SS YY:MM:DD UTC) that may correspond to when the investigation findings of an investigation caused an escalation to incident severity level and an explainable text string that may textually describe the time-based text string of the third stage, and a fourth stage may include a time-based text string (e.g., HH:MM:SS YY:MM:DD UTC) that may correspond to when one or more remediation actions were proposed in response to the cyber incident and an explainable text string that may textually describe the time-based text string of the fourth stage.

Remediation Actions|Resiliency Actions Automation

Additionally, or alternatively, in one or more embodiments, S240 may function to source an intelligent investigation storyboard that may include a region digitally mapped to a remediation action automation. The remediation action automation of a sourced intelligent investigation storyboard may provide a system-generated skeletal structure, that when executed, may be configured for input of one or more suggested remediation actions or resiliency actions proposed by the system 100 in response to a subject (cyber) incident. Accordingly, in response to installing the one or more remediation action data into a distinct region of a sourced intelligent investigation storyboard (or into the resiliency actions automation), the remediation action automation may be dynamically or automatically configured to present the installed remediation data via the remediation action automation. In some embodiments, adjacent to each proposed remediation action may be a selectable object that may be selectable to indicate a remediation implementation status of the proposed remediation action (e.g., a selectable object may include a checkmark in response to the subscriber selecting the selectable object that may indicate that the proposed remediation action was implemented, a selectable object may be absent of a checkmark indicating that the proposed remediation action may not have been implemented, yet).

Accordingly, in one or more embodiments, S240 may function to source analyst-generated remediation proposals and/or system-generated remediation proposals that may be stored or available in a third-party messaging channel and/or in a security mitigation user interface.

Additionally, in one or more embodiments, S240 may function to identify and/or collect one or more forward-looking technical security measures provided to the subscriber (e.g., technical resiliency security measures or actions) that may function to prevent a cyber incident similar to the identified cyber incident from reoccurring. It shall be noted that the technical resiliency security measures may be included within the remediation actions portion/section of the intelligent investigation storyboard or may alternatively be included in a section or portion of the intelligent investigation storyboard distinct from the remediation actions automation.

Attack Process Tree Automation

Additionally, or alternatively, in one or more embodiments, S240 may function to source (or instantiate) an intelligent investigation storyboard that may include a region digitally mapped to an attack process tree automation. An attack process tree automation that, when executed, may be a textual-based schematic that may indicate one or more malware installation characteristics corresponding to a target cyber incident. In such embodiments, an attack process tree automation may be programmatically configured to identify (e.g., install, receive, source etc.) the one or more malware installation characteristics required by the attack process tree automation relating to a target cyber incident, as shown generally by way of example in FIG. 5.

Accordingly, in response to installing the one or more malware installation characteristics into a distinct region of a sourced intelligent investigation storyboard (or into the attack process tree automation), the attack process tree automation may be dynamically or automatically configured to present (on the intelligent investigation storyboard) the installed investigation finding data via the attack process tree automation.

Intelligent Investigation Storyboard Configuration Types

It shall be noted that in some embodiments, an identified or sourced intelligent investigation storyboard and/or one or more sourced threat type-specific automations of the intelligent investigation storyboard may be in a plurality of programmatic configurations. In one embodiment, an identified or sourced intelligent investigation storyboard may be an installable-type investigation storyboard. The installable-type investigation storyboard may include a plurality of regions or threat type-specific automations that, when executed, may be configured to identify or receive investigation findings data from the one or more corpora of investigation findings data and install the identified or received investigation findings data to populate or render or execute one or more threat type-specific content automation.

In another embodiment, an identified or sourced intelligent investigation storyboard may be an encoded-type investigation storyboard. In such embodiments, the encoded-type investigation storyboard may include a plurality of encoded regions or encoded threat type-specific automations that may be configured to (automatically) execute one or more programmatic scripts to one or more data sources of the subscriber. Accordingly, the one or more programmatic scripts may function to collect investigation findings data specific to that target automation and in response to collecting the investigation finding data specific for that target automation, the target automation may populate or render or present the investigation finding data for that target automation.

2.5 Generating Incident-Specific Investigation Storyboards|Event-Specific Reporting Artifacts S250, which includes generating incident-specific investigation storyboards, may function to automatically system-generate an incident-specific investigation storyboard based on a target system-validated security alert and a sourced (or instantiated) investigation storyboard.

In one or more embodiments, an incident-specific investigation storyboard may be accessible and viewable by a target subscribing entity and/or security engineer, via a web-based user interface (e.g., a reporting interface) of the cybersecurity event detection and response service (e.g., the system 100 implementing the method 200). In such embodiments, the incident-specific investigation storyboard (or may also be referred to herein as event-specific reporting artifact) may display one or more textual-based finding automations and/or one or more graphical-based finding automations that may illustratively communicate or present to the subscriber relevant details, artifacts and/or characteristics of a target incident (e.g., in depth dive into a target system-validated security alert exceeding a threat severity level) based on investigation findings provided by S230. In one or more embodiments, a system-generated intelligent investigation storyboard may provide tuned artifacts (may also be referred to as tuned automations) to effectively provide insight or security content to the subscriber that may enable one or more rapid remediation actions to ameliorate (or mitigate) the threat and/or security risks of the cyber incident. It shall be noted that a cybersecurity event-specific reporting artifact may be generated by executing one or more of the above-mentioned threat type-specific content automations and based on the execution installing the investigation finding data and/or constructed schematic into a region of the digital cybersecurity artifact digitally mapped to the one or more threat type-specific content automations.

Generating an Incident-Specific Reporting Artifact by Installing Investigation Findings Data In one or more embodiments, in response to instantiating an intelligent investigation storyboard that may include one or more threat type-specific automations, S250 may function to generate an incident-specific investigation storyboard for a target system-validated security alert by executing the one or more threat type-specific automations and installing selective subsets of investigation findings data into one or more regions of the intelligent investigation storyboard or each of the one or more threat-specific automations of the intelligent investigation storyboard. In such embodiments, for each threat type-specific automation of a sourced intelligent investigation storyboard, S250 may function to install selective subsets of investigation findings data from the one or more corpora of investigation findings data relating to that specific threat type automation.

In a non-limiting example, one of the one or more threat type-specific automations of an instantiated investigation storyboard may be a non-generated login-to-location graphical automation and S250 may function to execute the non-generated login-to-location graphical automation and install investigation findings data relevant (or specific) to the non-generated login-to-location graphical that transforms the non-generated login-to-location graphical automation to an incident-specific (e.g., generated) login-to-location graphical automation. In another example, one of the one or more incident specific automations of a sourced investigation storyboard may be a non-generated subscriber digital asset-to-threat node automation and S250 may function to execute the non-generated subscriber digital asset-to-threat node automation and/or install investigation findings data relevant (or specific) to the non-generated subscriber digital asset-to-threat node graphical automation that transforms the non-generated subscriber digital asset-to-threat node graphical automation to an incident-specific (e.g., generated) subscriber digital asset-to-threat node graphical automation.

It shall be noted that, in one or more embodiments, S250 may function to install (e.g., populate, identify, or the like) investigation findings data corresponding to each threat type-specific automation of a sourced intelligent investigation storyboard after constructing one or more corpora of investigation findings data. In one or more alternative embodiments, S250 may function to install investigation findings data to one or more (or each) of the incident-specific automations of an intelligent investigation storyboard contemporaneous with a cybersecurity investigation and/or during a discovery of one or more investigation findings.

Generating an Incident-Specific Reporting Artifact via Encoding

In one or more embodiments, in response to instantiating an intelligent investigation storyboard that may include one or more encoded threat type-specific automations, S250 may function to generate an incident-specific investigation storyboard (corresponding to a target system-validated security alert) by automatically executing each encodable threat type-specific automation of the sourced intelligent investigation storyboard. In such embodiments, in response to executing a subject encoded threat type-specific automation, the subject encoded incident-specific automation may generate one or more investigation search queries (e.g., one or more API calls) to receive investigation finding data relating to the subject encoded threat-specific automation. Accordingly, in response to receiving one or more responses to the one or more API calls, S250 may function to collect, store, and/or pass the investigation findings data to the encoded threat-specific automation to automatically display or (e.g., pictorially) present the investigation findings data specific to that threat type-specific automation. That is, in response to the one or more API calls, the returned investigation findings data may be used as input into the subject encoded incident-specific automation.

Accordingly, in one or more embodiments, in response to instantiating an encoded investigation storyboard, S250 may function to bypass extracting investigation finding data from one or more corpora of investigation finding data as discussed in S230 (e.g., in response to the system implementing the method 200 fast-escalating (e.g., under a threshold period of time) a system-validated security alert of a specific threat type, S240 may function to source the encoded template based on the threat type and S250 may function to execute the automations of the encoded template).

In one or more embodiments of generating an incident-specific reporting artifact via installation or encoding, a proposed remediation action that may be included in a generated incident-specific reporting artifact may be digitally mapped to one or more content automations (e.g., the one or more threat type specific content automations described above) that may not be readily presented or displayed on the generated incident-specific reporting artifact. In such embodiments, S250 may function to regenerate the incident-specific reporting artifact to include the one or more content automations or a subset of the one or more content automations that was not readily presented or displayed on the previously generated incident-specific reporting artifact. In a variation to such embodiments, S250 may function to receive user input via the reporting interface displaying the generated incident-specific reporting artifact that may cause a generation of one or more content automations or a subset of the one or more content automations (e.g., one or more content automations not originally included in the digital cybersecurity artifact) within one or more select regions of the cybersecurity reporting artifact.

Optionally, in one or more embodiments of generating an incident-specific reporting artifact, an intelligent investigation storyboards may include the investigative queries and the respective responses as findings in a portion or section of the intelligent investigative storyboard. Additionally, or optionally, in some embodiments, S250 may function to re-generate (or update) one or more of the plurality of content-based automations of the cybersecurity event-specific reporting artifact based on the cybersecurity event detection and response service identifying additional digital event data (or data signals) that may relate to the cybersecurity event.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method comprising:
obtaining, via one or more processors, a security event associated with a subscriber;
identifying, via the one or more processors, an event reporting template of a plurality of distinct event reporting templates based on an attack vector type associated with the security event; and
automatically generating, via the one or more processors, a digital findings report for the security event based on executing one or more computer-executable automations mapped to the event reporting template.

2. The computer-implemented method according to claim 1, wherein:
the digital findings report includes a login-to-location graphic,
the login-to-location graphic is automatically generated based on executing a login-to-location automation,
the login-to-location graphic graphically displays login activity data of a target user account superimposed on a geographical map, and
the login activity data includes successful logins of the target user account and failed logins associated with the target user account.

3. The computer-implemented method according to claim 1, wherein:
the digital findings report includes a login-to-time graphic,
the login-to-time graphic is automatically generated based on executing a login-to-time automation, and
the login-to-time graphic graphically indicates login activity data of a target user account with respect to time.

4. The computer-implemented method according to claim 1, wherein:
the digital findings report includes a subscriber digital asset-to-threat node graphic, and
the subscriber digital asset-to-threat node graphic is automatically generated based on executing a subscriber digital asset-to-threat node automation that causes a construction of:
(a) one or more representations of subscriber digital assets affected by the security event,
(b) one or more representations of malicious threat nodes causing the security event, and
(c) one or more graphical edges, wherein each of the one or more graphical edges visually connects a distinct representation of the one or more representations of subscriber digital assets to the one or more representations of malicious threat nodes.

5. The computer-implemented method according to claim 1, further comprising:
automatically updating the digital findings report based on identifying additional digital event data related to the security event.

6. The computer-implemented method according to claim 1, wherein:
one of the one or more computer-executable automations include a remediation action automation that, when executed, graphically constructs one or more remediation-informed graphical user interface objects, and
each of the one or more remediation-informed graphical user interface objects includes a distinct remediation action proposal.

7. The computer-implemented method according to claim 6, wherein:
each of the one or more remediation-informed graphical user interface objects further includes a selectable object that indicates an implementation status of a corresponding remediation action proposal.

8. The computer-implemented method according to claim 1, wherein:
the digital findings report includes an alert-to-fix timeline,
the alert-to-fix timeline is automatically generated based on executing an alert-to-fix timeline automation, and
the alert-to-fix timeline graphically illustrates a chronological sequence of events from an initial detection of the security event to a creation of one or more remediation actions for the security event.

9. The computer-implemented method according to claim 1, further comprising
displaying, via a web-based user interface, the digital findings report, wherein the web-based user interface is electronically accessible by the subscriber.

10. A computer-implemented method comprising:
obtaining, via one or more processors, a security event associated with a subscriber;
identifying, via the one or more processors, an event reporting template of a plurality of distinct event reporting templates based on a likely threat type associated with the security event; and
automatically creating, via the one or more processors, a digital findings artifact for the security event based on executing one or more computer-executable automations mapped to the event reporting template.

11. The computer-implemented method according to claim 10, wherein:
the likely threat type corresponds to electronic messaging compromise; and
the event reporting template is specifically designed to communicate investigation findings associated with electronic messaging compromise incidents.

12. The computer-implemented method according to claim 10, wherein:
the likely threat type corresponds to commodity malware; and
the event reporting template is specifically designed to communicate investigation findings associated with commodity malware incidents.

13. The computer-implemented method according to claim 10, further comprising:
mitigating, via one or more threat mitigation actions, a cybersecurity threat associated with the security event based on the digital findings artifact.

14. The computer-implemented method according to claim 10, wherein:
the digital findings artifact includes a remediation action section that enumerates a list of remediation actions for mitigating a likely threat associated with the security event.

15. The computer-implemented method according to claim 14, wherein:
the remediation action section of the digital findings artifact is automatically created in response to identifying each remediation action proposed by an event detection and response service.

16. A method comprising:
identifying, via one or more processing devices, a security event associated with a subscriber;
identifying, via the one or more processing devices, an event reporting template of a plurality of distinct event reporting templates based on a type of attack vector associated with the security event; and automatically generating, via the one or more processing devices, an event-specific findings report for the security event based on executing one or more computer-executable automations mapped to the event reporting template.

17. The method according to claim 16, wherein:

one of the one or more computer-executable automations include a login-to-location graphical automation that, when executed, graphically displays login activity data of a target user account associated with the security event superimposed on a geographical map.

18. The method according to claim 17, wherein:

one of the one or more computer-executable automations include a login-to-time graphical automation that, when executed, graphically indicates login activity data of the target user account associated with the security event with respect to time.

19. The method according to claim 16, wherein:

one of the one or more computer-executable automations include an event digest automation comprising a prefabricated string of text that includes a plurality of slot-filling values within the prefabricated string of text, and the event digest automation, when executed, generates an event overview based on the security event by interweaving investigation findings data within the prefabricated string of text at the locations of the slot-filling values.

20. The method according to claim 16, wherein:

the event-specific findings report includes a plurality of distinct graphics, wherein each graphic of the plurality of distinct graphics is automatically generated by using at least a subset of investigation findings data obtained during an investigation of the security event.

* * * * *